(12) United States Patent
Lee

(10) Patent No.: US 7,839,618 B2
(45) Date of Patent: Nov. 23, 2010

(54) AC/DC POWER LINE COMMUNICATION MODEM

(75) Inventor: Chin-Lung Lee, Paoshan Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1290 days.

(21) Appl. No.: 11/375,481

(22) Filed: Mar. 13, 2006

(65) Prior Publication Data

US 2007/0152628 A1 Jul. 5, 2007

(30) Foreign Application Priority Data

Dec. 30, 2005 (TW) .............................. 94147503 A

(51) Int. Cl.
*H02J 7/00* (2006.01)
(52) U.S. Cl. ..................................................... 361/119
(58) Field of Classification Search .................. 361/119; 320/107; 324/142
See application file for complete search history.

(56) References Cited

U.S. PATENT DOCUMENTS 4,860,185 A * 8/1989 Brewer et al. .................. 363/41

2002/0002040 A1 1/2002 Kline et al. .................. 455/402
2003/0071719 A1 4/2003 Crenshaw et al. ....... 340/310.01
2003/0197425 A1* 10/2003 Montante ..................... 307/26

FOREIGN PATENT DOCUMENTS

| DE | 9204821 | 7/1992 |
|---|---|---|
| DE | 4200935 | 8/1993 |
| EP | 1054504 | 11/2000 |
| EP | 1285501 | 3/2004 |

* cited by examiner

*Primary Examiner*—Jared J Fureman
*Assistant Examiner*—Angela Brooks
(74) *Attorney, Agent, or Firm*—J.C. Patents

(57) ABSTRACT

An AC/DC power device for AC/DC power line communication is provided. An AC/DC protection circuit coupled to an AC/DC power line is able to receive an AC or DC power. An AC/DC configuration circuit coupled to the AC/DC protection circuit is used to switch between an AC mode and a DC mode PLC. An AC/DC coupling/filtering circuit coupled to the AC/DC configuration circuit is to couple and filter the received power, and then coupled an AC voltage or a first DC voltage. An AC/DC converter coupled to the AC/DC coupling/filtering circuit is used to convert the AC voltage into a second DC voltage. A DC/DC converter coupled to the AC/DC coupling/filtering circuit and the AC/DC converter is to convert the first DC voltage (DC mode) and convert the second DC voltage (AC mode), so as to output DC voltages respectively to analog and digital circuit of the PLC modem.

19 Claims, 5 Drawing Sheets

US 7,839,618 B2

AC/DC POWER LINE COMMUNICATION MODEM

CROSS-REFERENCE TO RELATED APPLICATION

This application claims the priority benefit of Taiwan application serial no. 94147503, filed on Dec. 30, 2005. All disclosure of the Taiwan application is incorporated herein by reference.

BACKGROUND OF THE INVENTION

1. Field of Invention

The present invention relates to a technique of a power line communication (PLC) modem, and more particularly, to a modem used for alternating current(AC)/direct current (DC) power line communication.

2. Description of Related Art

The home network is a necessary infrastructure construction for a digitized family, apparatuses in the future digital family will be provided with function of network connection. Power Line Communication (PLC) is one of the methods for implementing the family network. In a general power system, a voltage generated by a power plant is transmitted to a power substation through a high voltage power transmission line, and then transmitted to an outdoor transformer through a medium voltage power transmission line, so that the voltage is converted to a low voltage. The low voltage is then transmitted to each family via a low voltage power line. The PLC network utilizes such an existing hardware establishment, without additional wiring.

A PLC network can be connected with the outdoor Internet through the aforementioned medium voltage or low voltage power transmission lines, and a common user can access the network data by using the low voltage transmission line. Currently, the indoor home PLC network is a low voltage alternating current (AC) voltage (110V/220V) PLC network. FIG. 1 is a schematic view of the architecture of a PLC system. The upper portion of FIG. 1 schematically shows an indoor home PLC network. The user can access network resources through connecting the power line with a low voltage PLC modem. Such modem has a plug structure on one side, and various available digital interfaces on the other side capable of connecting to the computer, for example, Ethernet, USB, RS-232, and the like. The PLC modem can include a coupler 20, an indoor home PLC modem circuit 12, and a digital interface 14. The coupler 20 can be used to couple a signal to an AC power line 10, or to obtain data carried on the power signal from the AC power line 10 for transmission. Through the digital interface 14, the user can access data. The lower portion of the FIG. 1 schematically shows an outdoor medium voltage or low voltage PLC network, which includes a coupler 20, an outdoor network access PLC modem circuit 18, and a backbone network interface 22. This part mainly utilizes the connection between the outdoor medium voltage or low voltage PLC network and the Internet to transmit data.

FIG. 2 is a block diagram of a conventional low voltage PLC modem. FIG. 2 shows a circuit related to signal processing in the modem. The PLC used in home network is a low voltage AC PLC modem, in which the high frequency signal with information is carried onto the power line, and data is transmitted via the power line. With the conventional low voltage AC PLC modem, the high frequency signal is separated from the power line. The operation principle of the low voltage AC PLC is to transmit signals by utilizing the bandwidth ranged from 4 MHz to 21 MHz (e.g., HomePlug 1.0) or from 2 MHz to 28 MHz (e.g., HomePlug AV). The upper portion of FIG. 2 shows a receiver, and the lower portion shows a transmitter. The transmitter modulates and channel codes the user's data signals through a digital interface 44, a media access control (MAC) layer 42 and a physical (PHY) layer 40 by using an Orthogonal Frequency Division Multiplexing (OFDM) modulating technique and a Forward Error Correction (FEC) channel coding technique. The transmitter is coupled to the power line 10 through a digital to analog converter (DAC), an Analog Front End (AFE) 38 and a signal coupler and protection circuit 30, so as to transmit data. In the receiver portion, the data signal is first transmitted via a signal coupler and protection circuit 30 and the AFE/ADC 32. Then with the OFDM demodulation and FEC channel decoding 34 of the physical layer (PHY) 34, the user's data signal is demodulated and channel decoded. Subsequently, the received signal data is recovered through a MAC layer 36.

FIG. 3 is a schematic block diagram of a power processing part and a signal processing part of a conventional AC PLC modem. As shown in FIG. 3, the AC PLC modem mainly comprises two parts: one is a PLC modem signal processing part and the other is a power line AC voltage processing part. The bidirectional dashed-line flows in the lower portion of the figure shows the PLC modem signal processing part, and the unidirectional solid-line flows in the upper part shows the PLC voltage processing part. The signal processing part comprises a signal coupler and protection circuit 56, a PLC modem circuit 58 and a digital interface 60. The detail operation is the same as that of FIG. 2, which will not be redundantly described here.

The AC voltage processing part comprises an AC voltage coupler and protection circuit 50, and AC/DC converter 52 and a DC/DC converter 54. The AC voltage coupler and protection circuit 50 couples the AC voltage from the power line, and is able to suppress the surge/noise of AC/DC power and protect the AC/DC power. The AC/DC converter 52 converts the coupled AC voltages into DC voltages. The DC voltages outputted from the DC/DC converter 54 are respectively provided to the analog and the digital circuits of the PLC modem.

However, in the future, outdoor mobile platforms, such as, vehicles, transportation buses, high-speed railway, airplanes and rapid transportation systems, has gradually become a conceptual extension of a mobile office and living room in home. Therefore, it is necessary for common infrastructure constructions of both the outdoor mobile platform network and indoor home network. The outdoor mobile platform PLC network is a DC voltage (12V/24V/42V) PLC network, but the development of the current PLC technique still focuses on the AC PLC network. Moreover, since the existent AC PLC modem cannot be applied directly to the DC PLC of the future outdoor mobile platform, the current indoor network platform and the future mobile network platform are not compatible.

Therefore, it has become an urgent issue to research and develop a PLC modem that can be respectively applied in the indoor family network low voltage AC PLC and the outdoor mobile platform in-vehicle network DC PLC. In the AC/DC dual mode PLC system, the AC/DC power is the most critical part in the modem.

SUMMARY OF THE INVENTION

In view of the above problems, one object of the present invention is to provide an power device for an AC/DC power line communication (PLC) modem, used by the AC/DC dual mode PLC modem. Therefore, the AC/DC dual mode PLC modem is provided with the transmission capability for network accessing through an AC or a DC power line, and furthermore, the AC/DC dual mode PLC modem can be applied in a general indoor home low voltage AC PLC network environment and an outdoor mobile platform DC PLC network environment.

In order to achieve the above object, the present invention provides an AC/DC power device for an AC/DC PLC modem. The AC/DC power device comprises an AC/DC protection circuit, an AC/DC configuration circuit, an AC/DC coupling/filtering circuit, an AC/DC converter and a DC/DC converter. The AC/DC protection circuit is coupled to the AC/DC power-line, and receives an AC or a DC power from the AC/DC power line. The AC/DC configuration circuit is coupled to the AC/DC protection circuit and used for configuring the PLC modem as an AC mode or a DC mode, depending on the power line being an AC power line or a DC power line. The AC/DC coupling/filtering circuit coupled to the AC/DC configuration circuit is used for coupling and filtering the received AC or DC power, and coupling an AC voltage or a first DC voltage. The AC/DC converter coupled to the AC/DC coupling/filtering circuit is used for converting the AC voltage coupled by the AC/DC coupling/filtering circuit, and outputting a second DC voltage. The DC/DC converter is coupled to the AC/DC coupling/filtering circuit or the AC/DC converter. In the DC mode, the DC/DC converter converts the first DC voltage output from the AC/DC coupling/filtering circuit, and in the AC mode the DC/DC converter converts the second DC voltage output from the AC/DC converter, so as to output a plurality of DC voltages to be provided to the analog and the digital circuits of the PLC modem respectively.

In the above AC/DC power device for AC/DC dual mode PLC modem, the AC/DC protection circuit can further comprises a fuse and a metal oxide varistor (MOV). The AC/DC coupling/filtering circuit can comprises an AC coupling/filtering circuit and a DC coupling/filtering circuit. The AC coupling/filtering circuit and the DC coupling/filtering circuit can respectively comprises at least one or more capacitors connected in parallel and a common mode choke. The output end of the common mode choke of the DC coupling/filtering circuit can be further coupled to a ferrite bead (FB).

In the above AC/DC power device for the AC/DC dual mode PLC modem, the AC/DC configuration circuit can set the AC or the DC mode through a simple switch. The AC/DC converter can be a circuit at least comprising of a transformer and a bridge rectifier. The AC/DC converter can comprises an FB coupled to the output of the bridge rectifier.

In the above AC/DC power device for the AC/DC dual mode PLC modem, the DC/DC converter can comprises a DC/DC converter, for outputting the plural DC voltages to be respectively provided to the analog and the digital circuits of the PLC modem. The input ends of the DC/DC converter can be further coupled to the FB respectively.

Furthermore, the present invention further provides an AC/DC dual mode PLC modem. The power processing part utilizes the above AC/DC power device. The signal processing part of the PLC modem can comprise, for example, a digital interface for outputting or inputting a communication data; a PLC modem circuit coupled to the digital interface, for processing the communication data; and a signal coupler coupled to the AC/DC power line and the PLC modem circuit, for receiving or transmitting the communication data. Generally, the inner structure of the signal processing part is not particularly limited, and any design for the PLC modem circuit can be applied to the AC/DC power device of the present invention.

In summary, through the above AC/DC power device or through the AC/DC PLC modem with the power device, an AC/DC dual mode PLC modem suitable for both the indoor home network AC PLC and the future outdoor mobile platform in-vehicle network DC PLC is provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention is to provide an AC/DC dual mode power line communication (PLC) modem. The technology of the AC/DC dual mode PLC modem mainly includes two parts: one is the signal processing technology for PLC modem, and the other is the power line AC/DC voltages processing technology. The method through which the signal processing technology for the PLC modem can be achieved is not limited in the present invention, and any of signal processing technologies can be applied to the present invention. The following detailed description is focused on the power line AC/DC voltage processing technology only.

Figure 1:
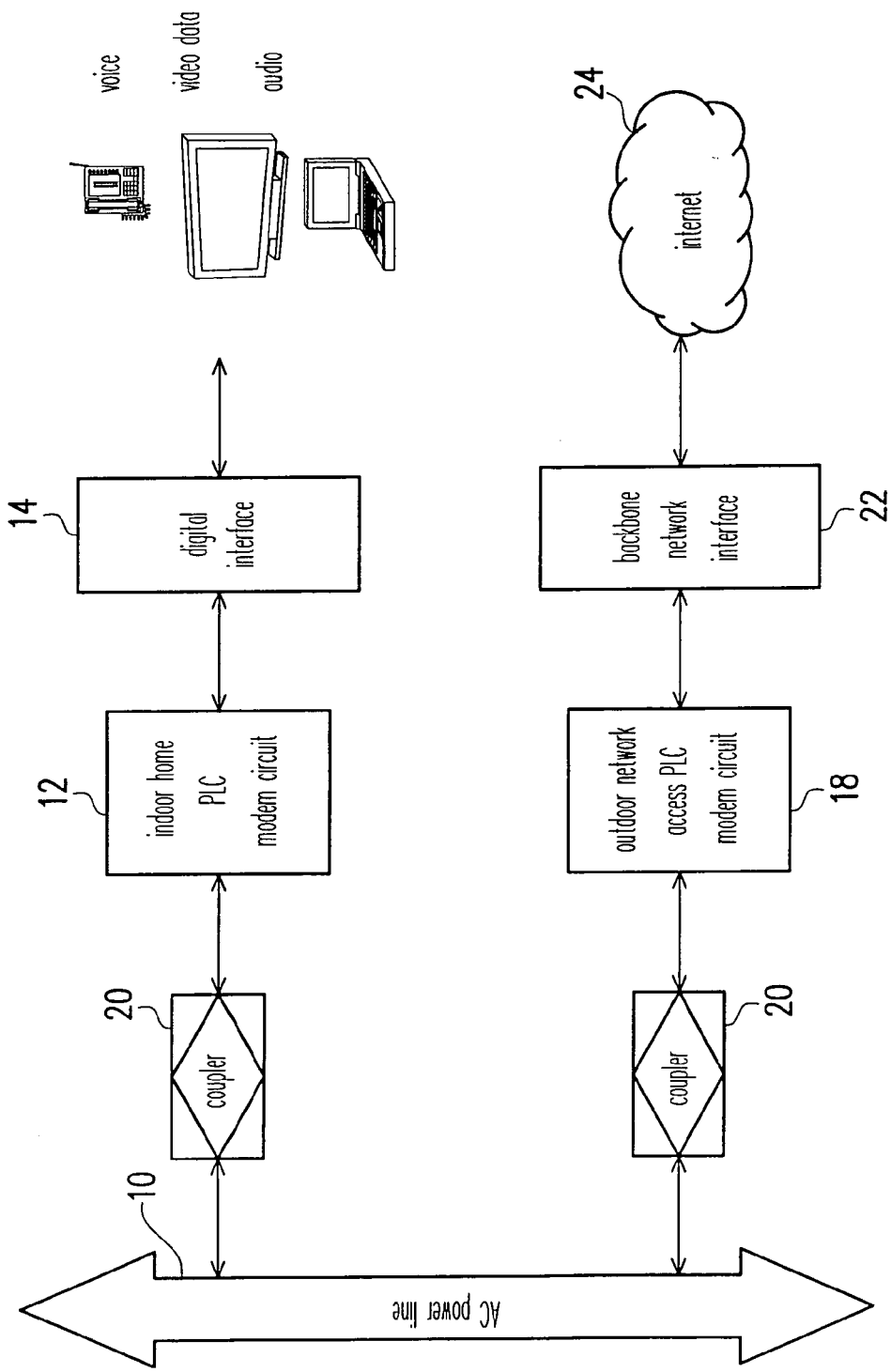
FIG. 1 is a schematic diagram showing an architecture of the AC PLC system.
Figure 2:
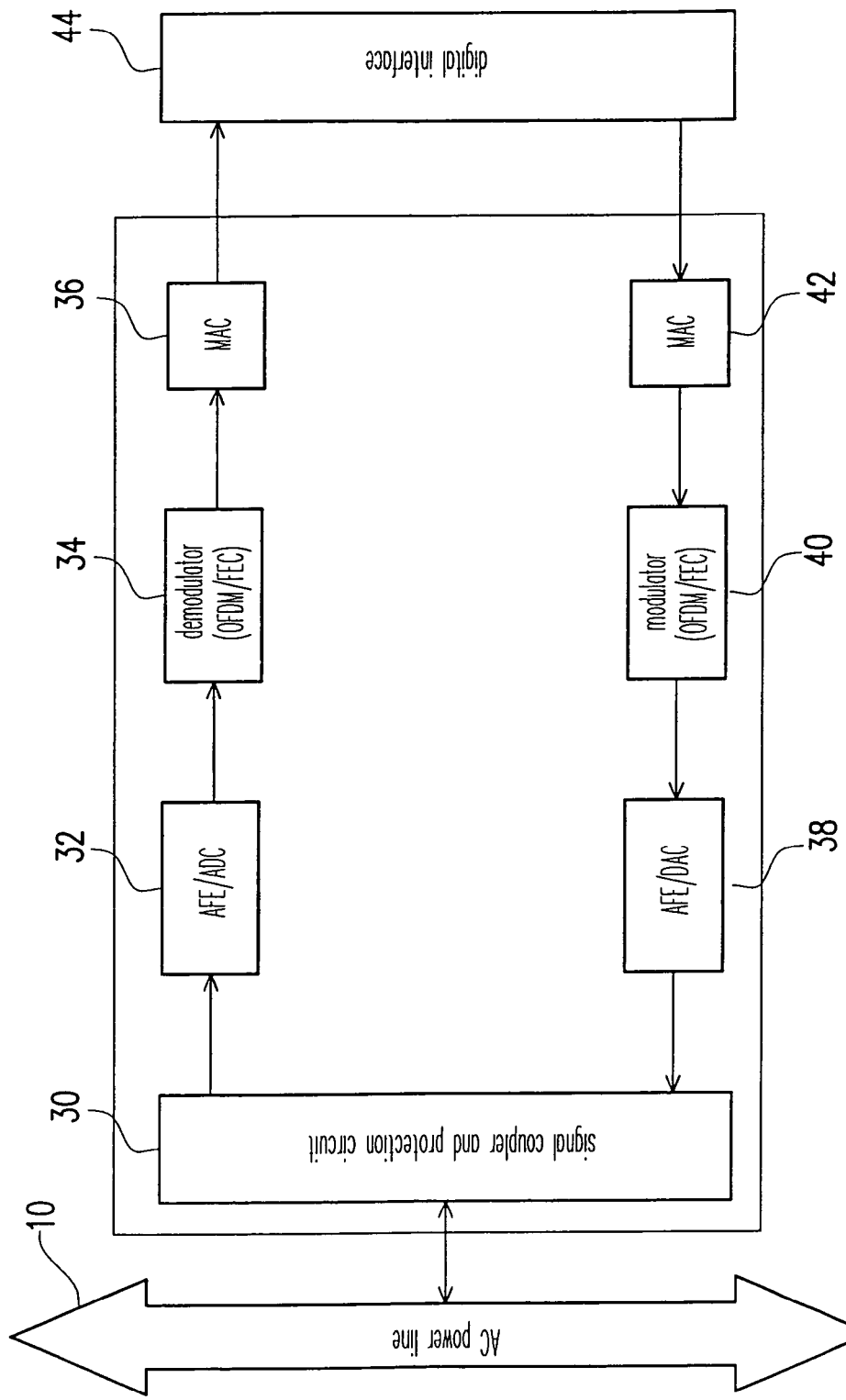
FIG. 2 is block diagram showing of a conventional AC PLC modem.
Figure 3:
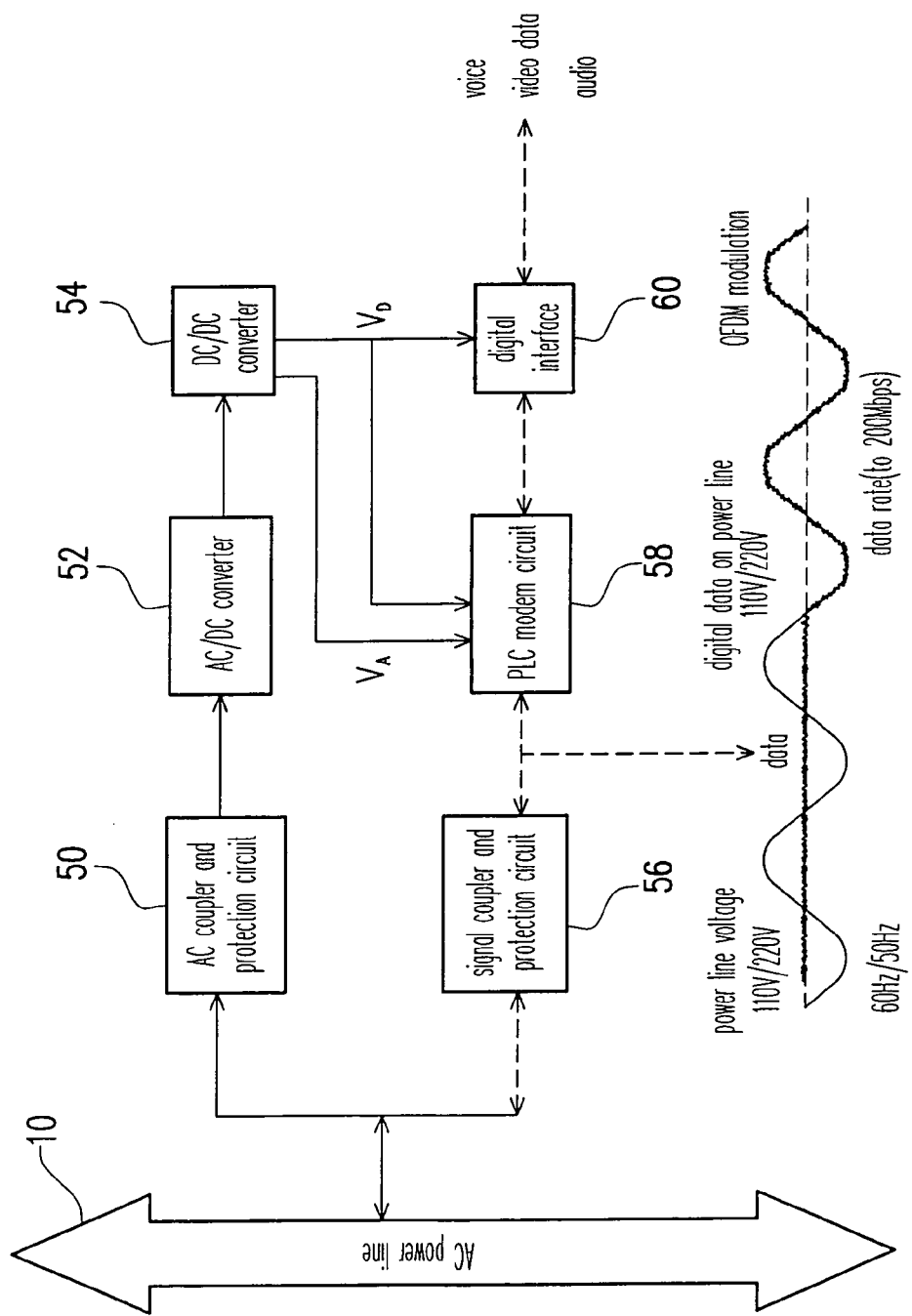
FIG. 3 is a schematic block diagram showing the power processing part and the signal processing part according to the conventional AC PLC modem.
Figure 4:
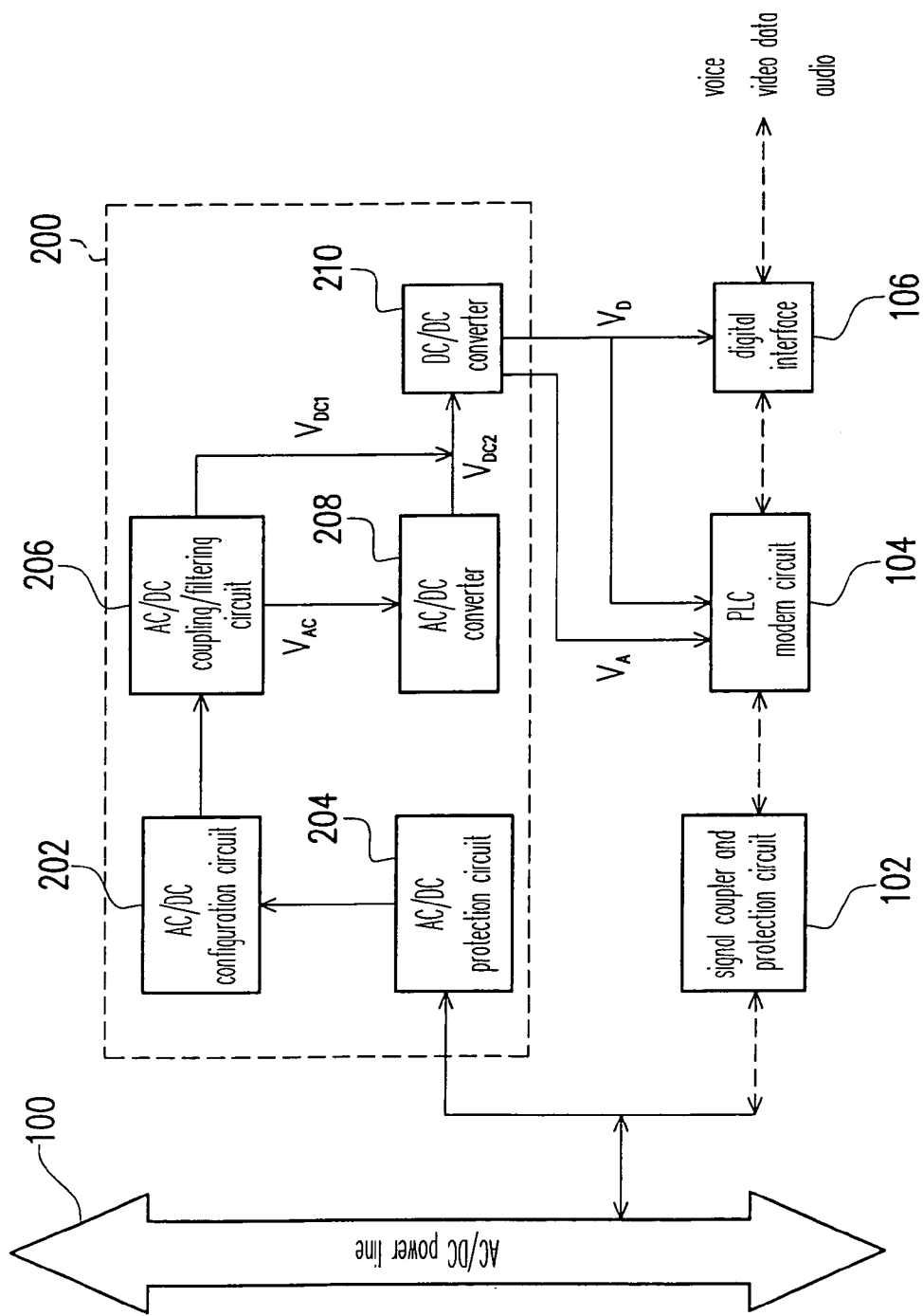
FIG. 4 is a block diagram of an AC/DC power device for an AC/DC dual mode PLC modem according to an embodiment of the present invention.

FIG. 4 is a block diagram of an AC/DC power device for an AC/DC dual mode PLC modem according to an embodiment of the present invention. As shown in FIG. 4, the bidirectional dashed lines in the lower portion of the figure is a circuit related to the PLC modem signal processing, which generally includes, e.g., a signal coupler and protection circuit 102, a PLC modem circuit 104, and a digital interface 106. The unidirectional solid lines in the dashed block of the upper portion of FIG. 4 is a circuit 200 related to the AC/DC voltage processing for the AC/DC dual mode PLC modem, which includes an AC/DC protection circuit 204, an AC/DC configuration circuit 202, an AC/DC coupling/filtering circuit 206, an AC/DC converter 208 and a DC/DC converter 210.

As shown in FIG. 4, the AC/DC protection circuit 204 is coupled to the AC/DC power line 100. The power line can be an AC power line or a DC power line. AC power or DC power can be coupled from the AC/DC power line 100, and effects of suppressing the surge/noise and protecting the AC/DC power can be achieved. The AC/DC configuration circuit 202 is coupled to the AC/DC protection circuit 204 for configuring the PLC modem to an AC mode or a DC mode depending on that the AC/DC power line 100 is an AC power line or a DC power line. In other words, the AC/DC power device of the present invention can provide an AC or DC power processing mechanism according to different power environments. Through the AC/DC configuration circuit 202, when the power is a DC power, the AC/DC power device can be configured to the DC mode, and when the power is an AC power, the AC/DC power device can be configured to the AC mode.

Generally, the AC mode is often used for the low AC voltage used in home or office, i.e., the indoor plugs of the commercial power. The DC mode is often used for the DC voltage provided in so-called mobile platform environments, such as vehicles, transportation buses, trains, high-speed railway, or airplanes, etc.

The AC/DC coupling/filtering circuit 206 is coupled to the AC/DC configuration circuit 202 for coupling and filtering the received AC or DC power, and coupling an AC voltage $V_{AC}$ or a first DC voltage $V_{DC1}$. The AC/DC coupling/filtering circuit 206 is mainly used for coupling and filtering the AC power or DC power. That is, the AC/DC coupling/filtering circuit 206 comprises an AC coupling/filtering circuit and a DC coupling/filtering circuit. When the AC/DC power line 100 is a DC power, the AC/DC configuration circuit 202 is configured to the DC mode, and the AC/DC coupling/filtering circuit 206 couples and filters the DC power, and couples the first DC voltage $V_{DC1}$ of the DC mode. When the AC/DC power line 100 is an AC power, the AC/DC configuration circuit 202 is configured to the AC mode, and the AC/DC coupling/filtering circuit 206 couples and filters the AC power, and couples the AC voltage $V_{AC}$ of the AC mode to the AC/DC converter 208.

The AC/DC converter 208 is coupled to the AC/DC coupling/filtering circuit 206 for converting the AC mode voltage coupled by the AC/DC coupling/filtering circuit 206 and then outputting a second DC voltage $V_{DC2}$. The AC/DC converter 208 only operates in the AC mode. After being coupled and filtered, the received AC voltage $V_{AC}$ is then converted to the second DC voltage $V_{DC2}$ by the AC/DC converter 208.

The DC/DC converter 210 is coupled to the AC/DC coupling/filtering circuit 206 or the AC/DC converter 208. In DC mode, the DC/DC converter 210 converts the first DC voltage $V_{DC1}$ outputted from the AC/DC coupling/filtering circuit 206. In AC mode, the DC/DC converter 210 converts the second DC voltage $V_{DC2}$ outputted from the AC/DC converter. In DC mode, after the DC voltage received from the AC/DC power line 100 is processed by the AC/DC coupling/filtering circuit 206, the obtained first DC voltage $V_{DC1}$ is transmitted to the DC/DC converter 210. In AC mode, after the AC voltage received from the AC/DC power line 100 is processed by the AC/DC coupling/filtering circuit 206 and the AC/DC converter 208, the obtained second DC voltage $V_{DC2}$ is provided to the DC/DC converter 210.

Generally, the obtained first DC voltage $V_{DC1}$, and second DC voltage $V_{DC2}$ often cannot be directly used by the modem. Therefore, the DC voltages $V_{DC1}$ and $V_{DC2}$ should be converted to DC voltages with other levels by using the DC/DC converter 210. Moreover, the signal processing part in the PLC modem has different circuit units, so that one and more DC voltages may be required. Thus, the DC/DC converter 210 herein can be a one-to-multiple DC/DC converter. In addition, as mentioned above, since the PLC modem is further provided with a digital interface 106, and the PLC modem circuit 104 also has an analog circuit and a digital circuit, the DC/DC converter 210 further needs to be provided with a DC voltage signal $V_A$ to be provided to the analog circuit of the PLC modem 104 and a DC voltage signal $V_D$ to be provided to the digital circuits of the PLC modem 104 and the digital interface 106. In this way, the DC voltages provided for the analog and digital circuits are separated, thus the noises can be prevented from interfering with each other, thereby enhancing the stability of the PLC system.

In the above description, only each circuit function block of the AC/DC power device 200 is simply illustrated. A detail description will be made below with reference to an exemplary practical circuit.

Then, the signal processing part of the AC/DC dual mode PLC modem will be illustrated. The circuits related to the signal processing part are not particularly limited by the present invention, and the conventional low voltage AC PLC modem signal processing technologies, such as, HomePlug 1.0 or HomePlug AV, can be also used. Referring to FIG. 4, the circuit of the signal processing part comprises a signal coupler and protection circuit 102, a PLC modem circuit 104, and a digital interface 106.

The digital interface 106 is used for providing information bi-directionally transmitted through the computer network to the user. The information can be voice, video, audio and data, etc. The user also can upload the data to the power line network, even Internet, via the digital interface 106. The PLC modem circuit 104 is coupled to the digital interface 106 for processing the above data. Since the signal processing part is not the key point of the present invention, its core circuit part will not be described in detail. Those skilled in the art can make any design modifications.

The signal coupler and protection circuit 102 is coupled to the AC/DC power line 100 and the PLC modem circuit for coupling the above signal data. One function of the signal coupler and protection circuit 102 is to carry the uploaded data onto the power signal of the power line, i.e., coupling the data into the power signal, so that the data can be transmitted to the network via the power signal. On the other hand, as for the receiving part, the signal coupler and protection circuit 102 retrieves the data carried on the power signal. Moreover, the signal coupler and protection circuit 102 also provides effects of protection and surge/noise suppression.

Figure 5:
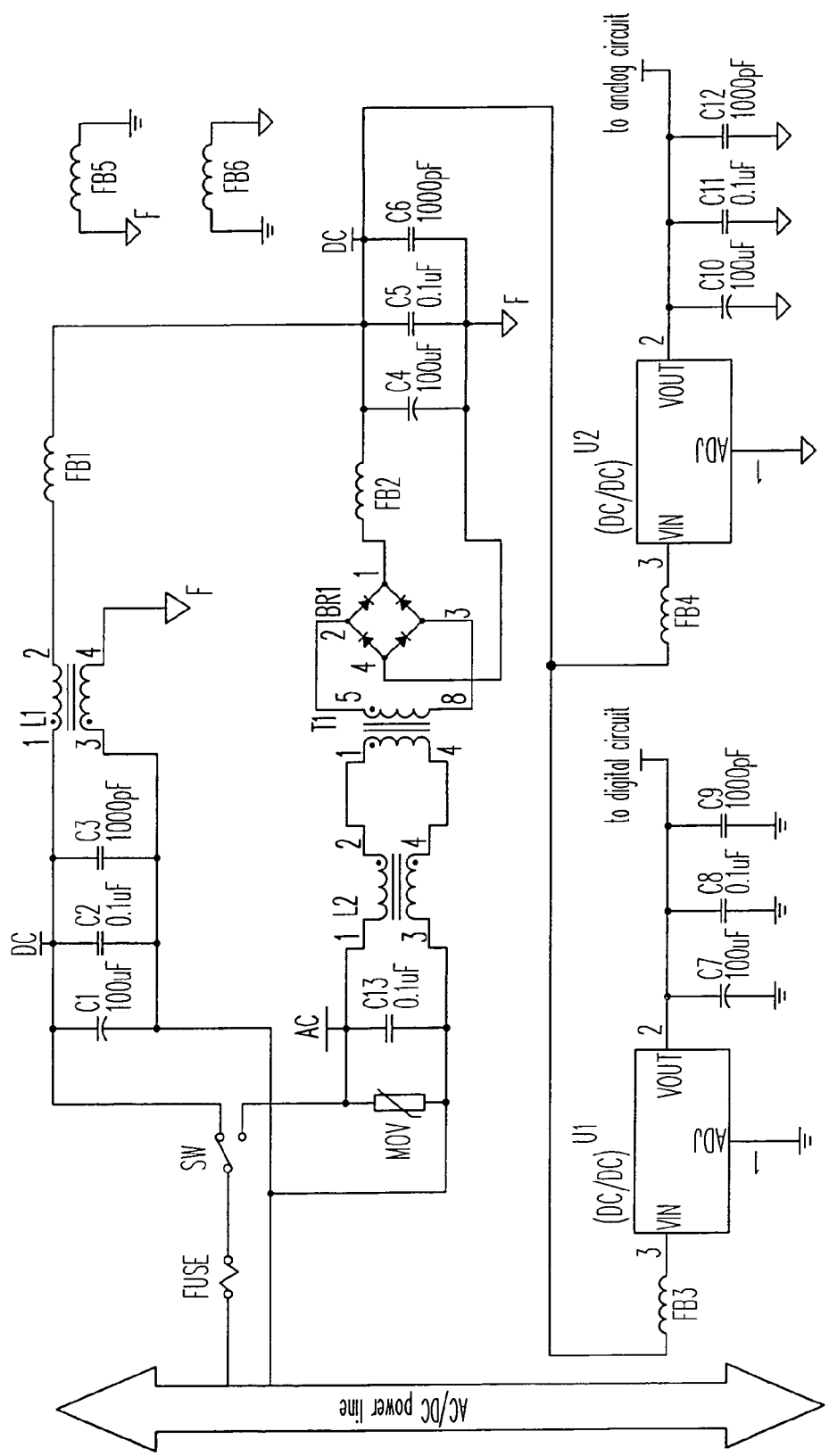
FIG. 5 is a diagram showing an exemplary circuit of the AC/DC power device of FIG. 4.

The structure and operation method of the above AC/DC power device 200 will be further illustrated by an exemplary practical circuit as an example. FIG. 5 is an example showing the practical circuit of the AC/DC power device of FIG. 4. As shown in FIG. 5, the AC/DC protection circuit 204 protects the AC/DC PLC modem from the surge/noise transient voltage. Specifically, a fuse and a metal oxide varistor (MOV), arranged at the input ends of the AC/DC power line, can be used as an example of the AC/DC surge/noise transient voltage protection circuit. When a surge/noise transient voltage occurs, the fuse and the MOV can be used to suppress and eliminate the surge/noise transient voltage, so as to suppress the surge/noise and to protect the AC/DC power device.

The AC/DC configuration circuit 202 can be used for selecting the AC/DC power system. Specifically, it can be implemented by a simple switch SW shown in FIG. 5. When used in a convention indoor AC PLC network, the switch SW can be switched (for example, downward with respect to FIG. 5) to select an AC voltage processing circuit. In contrast, if used in the DC PLC network of an outdoor mobile platform in-vehicle network, the switch SW is switched upwards to select a DC voltage processing circuit.

The AC/DC coupling/filtering circuit 206 is mainly used for coupling and filtering the AC/DC power signal, and for example, can be implemented by using a transformer, a common mode choke, a ferrite bead (FB), or parallel-connected capacitors with various sizes, for coupling and filtering. The common mode choke also can be used to reduce the electromagnetic interference (EMI). As described above, the AC/DC coupling/filtering circuit 206 has an AC coupling/filtering circuit and a DC coupling/filtering circuit, i.e., providing two different paths respectively for the AC mode and the DC mode. In the circuit example of FIG. 5, the circuit for the DC voltage mode comprises capacitors C1, C2 and C3 connected in parallel, and a common mode choke L1 connected in series with the capacitors C1, C2, and C3. The capacitors C1, C2, and C3 are respectively used for filtering noises of the DC voltages at the low, medium, and high frequency bands. L1 is a DC common mode choke, and used as an EMI filter. The output of the common mode choke L1 can be coupled to a ferrite bead FB1 for filtering the DC voltage. Furthermore, the circuit of the AC voltage mode comprises a capacitor C13 and a common mode choke L2 connected in series with the capacitor C13. The capacitor C13 is used for filtering the noise of the AC voltage. L2 is an AC common mode choke and also used as an EMI filter.

The AC/DC converter 208 is an AC to DC voltage converter consisting of a transformer T1 and a bridge rectifier BR1 in FIG. 5, and provides DC voltage inputting to the converters U1 and U2 of the DC/DC converter 210. The output of the bridge rectifier BR1 can be coupled to a ferrite bead FB2 for filtering the DC voltage. The capacitors C4-C6 in FIG. 5 are also used for respectively filtering noises of DC voltages at the low, medium, and high frequency bands.

The DC/DC converter 210 can comprise two DC/DC converters, in which one converter U1 is used for providing the DC voltage to the PLC modem digital circuit, e.g., the digital circuit part of the PLC modem circuit 104 and the digital interface 106 in FIG. 4; the other converter U2 is used for providing the DC voltage to the PLC modem analog circuit, e.g., the DC voltage for the analog circuit of the PLC modem circuit 104 in FIG. 4. The inputs of the converters U1, U2 can be further respectively coupled with ferrite beads FB3, FB4, for further filtering the input signals of the DC voltage. The outputs of the converters U1, U2 can be further respectively coupled with parallel-connected capacitors C7-C9, C10-C12, for filtering noises of the DC voltages at the low, medium, and high frequency bands outputted from the converters U1, U2.

The DC/DC converter 210 is used for separating DC voltages into two parts respectively used by the analog circuit and by the digital circuit. In this way, the digital circuit and the analog circuit can obtain pure DC voltage respectively, and thereby further preventing the noises of the PLC modem from interfering with each other. This configuration can enable the PLC modem to be more stable. Further, grounding the power voltage signal can be achieved by connecting FB5 and FB6 with the digital circuit signal ground and the analog circuit signal ground of the PLC modem respectively, so that the high-frequency grounding noises can be reduced.

In summary, through the above AC/DC power device or through an AC/DC dual mode PLC modem with the power device, an AC/DC dual mode PLC modem that can be applied to both the AC PLC of the indoor home network and the future DC PLC of the outdoor mobile platform in-vehicle network.

Furthermore, when the in-vehicle DC power line for the outdoor mobile platform is used as an in-vehicle network, and designed as a DC PLC network through the DC PLC technology, the present invention can be applied to the DC PLC network of the mobile platform in-vehicle network in the future. In this case, the present invention at least has the following advantages: (1) No particular network data transmission wirings are required to be arranged, since the in-vehicle PLC is directly used; and the in-vehicle wires, connectors, and the like in the mobile platform can be reduced; (2) since wires and connectors are not used, the costs for the mobile platform can be reduced; (3) similarly, due to the same reason, the weight of the mobile platform can of course be reduced, thereby saving fuel; (4) various specifications of DC voltages, DC 12V/24V/42V can be used alternatively, thus there is no need to worry about the power specification; and (5) it is flexible and convenient for usage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An AC/DC power device for an AC/DC dual mode power line communication (PLC) modem, comprising:
    an AC/DC protection circuit coupled to an AC/DC power line, for receiving an AC power or DC power from the AC/DC power line;
    an AC/DC configuration circuit coupled to the AC/DC protection circuit, for configuring as an AC mode or a DC mode according to that the power line is an AC power line or a DC power line;
    an AC/DC coupling/filtering circuit coupled to the AC/DC configuration circuit, for coupling and filtering the received AC or DC power, and coupling an AC voltage (in the AC mode) or a first DC voltage (in the DC mode);
    an AC/DC converter coupled to the AC/DC coupling/filtering circuit, for converting the AC voltage coupled by the AC/DC coupling/filtering circuit, and outputting an second DC voltage; and
    an DC/DC converter coupled to the AC/DC coupling/filtering circuit and the AC/DC converter, for converting the first DC voltage outputted from the AC/DC coupling/filtering circuit in the DC mode, and converting the second DC voltage outputted from the AC/DC converter in the AC mode, so that a plurality of DC voltages is outputted to respectively provide to analog and digital circuits of the PLC modem.

2. The AC/DC power device for the AC/DC dual mode PLC modem as claimed in claim 1, wherein the AC/DC protection circuit is a fuse.

3. The AC/DC power device for the AC/DC dual mode PLC modem as claimed in claim 2, wherein the AC/DC protection circuit further comprises a metal oxide varistor (MOV).

4. The AC/DC power device for the AC/DC dual mode PLC modem as claimed in claim 1, wherein the AC/DC coupling/filtering circuit further comprises an AC coupling/filtering circuit and an DC coupling/filtering circuit, wherein the AC coupling/filtering circuit and the DC coupling/filtering circuit respectively comprises at least one capacitor and a common mode choke connected in parallel with multiple capacitors.

5. The AC/DC power device for the AC/DC dual mode PLC modem as claimed in claim 4, wherein an output end of the common mode choke of the DC coupling/filtering circuit is coupled with a ferrite bead (FB).

6. The AC/DC power device for the AC/DC dual mode PLC modem as claimed in claim 1, wherein the AC/DC configuration circuit is a switch.

7. The AC/DC power device for the AC/DC dual mode PLC modem as claimed in claim 1, wherein the AC/DC converter is a circuit at least comprising a transformer and a bridge rectifier.

8. The AC/DC power device for the AC/DC dual mode PLC modem as claimed in claim 7, wherein the AC/DC converter further comprises an FB coupled to an output of the bridge rectifier.

9. The AC/DC power device for the AC/DC dual mode PLC modem as claimed in claim 1, wherein the DC/DC converter further comprises DC/DC converters respectively for the analog and the digital circuits of the PLC modem, for outputting the plural DC voltages to respectively provide to the analog and the digital circuits of the PLC modem.

10. The AC/DC power device for the AC/DC dual mode PLC modem as claimed in claim 9, wherein the input ends of the DC/DC converters for the analog and the digital circuits are respectively coupled with an FB.

11. An AC/DC dual mode PLC modem, comprising:
a digital interface, for outputting or inputting communication data;
a PLC modem circuit coupled to the digital interface, for processing the communication data;
a signal coupler coupled to an AC/DC power line and the power line modem circuit, for receiving or transmitting the communication data;
an AC/DC protection circuit coupled to the AC/DC power line, for receiving an AC power or a DC power from the AC/DC power line;
an AC/DC configuration circuit coupled to the AC/DC protection circuit, for configuring as an AC mode or an DC mode according to that the AC/DC power line is an AC power line or a DC power line;
an AC/DC coupling/filtering circuit coupled to the AC/DC configuration circuit, for coupling and filtering the received AC or DC power, and coupling an AC voltage or a first DC voltage;
an AC/DC converter coupled to the AC/DC coupling/filtering circuit, for converting the AC voltage outputted form the AC/DC coupling/filtering circuit, and outputting a second DC voltage; and
a DC/DC converter coupled to the AC/DC coupling/filtering circuit and the AC/DC converter, for converting the first DC voltage outputted from the AC/DC coupling/filtering circuit in the DC mode, and converting the second DC voltage outputted from the AC/DC converter in the AC mode, so that a plurality of DC voltages is outputted to respectively provide to analog and digital circuits of the PLC modem.

12. The AC/DC dual mode PLC modem as claimed in claim 11, wherein the AC/DC protection circuit at least comprises a fuse and a metal oxide varistor (MOV).

13. The AC/DC dual mode PLC modem as claimed in claim 11, wherein the AC/DC coupling/filtering circuit further comprises an AC coupling/filtering circuit and a DC coupling/filtering circuit, and the AC coupling/filtering circuit and the DC coupling/filtering circuit respectively comprises at least one capacitor and a common mode choke connected in parallel with multiple capacitors.

14. The AC/DC dual mode PLC modem as claimed in claim 13, wherein an output end of the common mode choke of the DC coupling/filtering circuit is coupled with an FB.

15. The AC/DC dual mode PLC modem as claimed in claim 11, wherein the AC/DC configuration circuit is a switch.

16. The AC/DC dual mode PLC modem as claimed in claim 11, wherein the AC/DC converter is a circuit at least comprising a transformer and a bridge rectifier.

17. The AC/DC dual mode PLC modem as claimed in claim 16, wherein the AC/DC converter further comprises an FB coupled to an output of the bridge rectifier.

18. The AC/DC dual mode PLC modem as claimed in claim 11, wherein the DC/DC converter further comprises DC/DC converters respectively used for the analog and the digital circuits of the PLC modem, for outputting the plural DC voltages to respectively provide to the analog and the digital circuits of the PLC modem respectively, wherein input ends of the DC/DC converters for the analog and the digital circuits are respectively coupled with an FB.

19. The AC/DC dual mode PLC modem as claimed in claim 11, wherein the signal coupler further comprises a protection circuit.

* * * * *